3,074,960
5-LOWER-ALKYLMERCAPTO-1-MONOCARBO-
CYCLIC ARYLMETHYLTRYPTAMINES AND
INTERMEDIATES AND PROCESSES THERE-
FOR
Sydney Archer, Bethlehem, N.Y., assignor to Sterling
Drug Inc., New York, N.Y., a corporation of Delaware
No Drawing. Filed Feb. 23, 1960, Ser. No. 10,070
27 Claims. (Cl. 260—319)

This invention relates to compositions of matter of the class of 1-monocarbocyclic arylmethyl tryptamine derivatives, their acid-addition salts, 1-monocarbocyclic arylmethyl 3-phthalimidoethylindoles and to methods for their preparation. In particular, this invention is concerned with tryptamines and phthalimidoethylindoles having in the 5-position a lower-alkylmercapto group.

A derivative of the above class, 1-benzyl-2-methyl-5-methoxytryptamine hydrochloride, is known. The invention here resides in the concept of a composition of matter in which a lower-alkylmercapto group is attached to the 5-position of a 1-monocarbocyclic arylmethyltryptamine. It is also concerned with certain novel intermediates and with processes for making such intermediates and for making said tryptamine derivatives.

In the compounds of my invention, the 1-monocarbocyclic arylmethyl group can be unsubstituted phenylmethyl or phenylmethyl substituted by one or more groups such as halogen (including fluorine, chlorine, bromine and iodine), lower-alkyl, lower-alkoxy, lower-alkylmercapto, nitro, hydroxy, lower-acyloxy, methylenedioxy.

A preferred aspect of my invention relates to compounds having the structure:

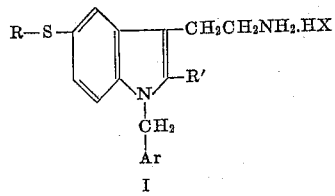

I wherein R is lower-alkyl, R' is hydrogen, lower-alkyl or monocarbocyclic aryl, Ar is a monocarbocyclic aryl group and X is the anion of a mineral or organic acid, HX.

In the above general Formula I, R represents a lower-alkyl group, which can be either straight or branched and contains from one to about four carbon atoms. Among the radicals representing R are methyl, ethyl, propyl, isopropyl, butyl, isobutyl, secondary-butyl or tertiary-butyl, for example.

The group R' in the above general Formula I represents hydrogen, a lower-alkyl radical or a monocarbocyclic aryl group. If R' be a lower-alkyl radical, it can be either straight or branched and contains from one to about four carbon atoms. When R' is monocarbocyclic aryl it can be phenyl or phenyl substituted by one or more groups selected from the group consisting of halogen (including fluorine, chlorine, bromine and iodine), lower-alkyl, lower-alkoxy, lower-alkylmercapto, hydroxy, lower-acyloxy or methylenedioxy. R' thus stands, inter alia, for hydrogen, methyl, ethyl, propyl, isopropyl, butyl, isobutyl, secondary-butyl, tertiary-butyl, phenyl, p-chlorophenyl, p-tolyl, p-methoxyphenyl, p-methylmercaptophenyl, p - hydroxyphenyl, p-acetoxyphenyl, 3,4 - methylenedioxyphenyl or trimethoxyphenyl.

In the above general Formula I, Ar represents a monocarbocyclic aryl group. It can be phenyl, or phenyl substituted by one or more groups selected from the group consisting of halogen (including fluorine, chlorine, bromine and iodine), lower-alkyl, lower-alkoxy, lower-alkylmercapto, nitro, hydroxy, lower-acyloxy, or methylenedioxy. Ar thus stands, inter alia, for phenyl, p-chlorophenyl, p-tolyl, p-methoxyphenyl, p-methylmercaptophenyl, p-nitrophenyl, p-hydroxyphenyl, p-acetoxyphenyl, 3,4-methylenedioxyphenyl, or trimethoxyphenyl.

In the above general Formula I, X represents the anion of a mineral or organic acid, HX.

The compounds of the present invention can be prepared by the following reactions in which R, R', Ar and X have the meanings given above:

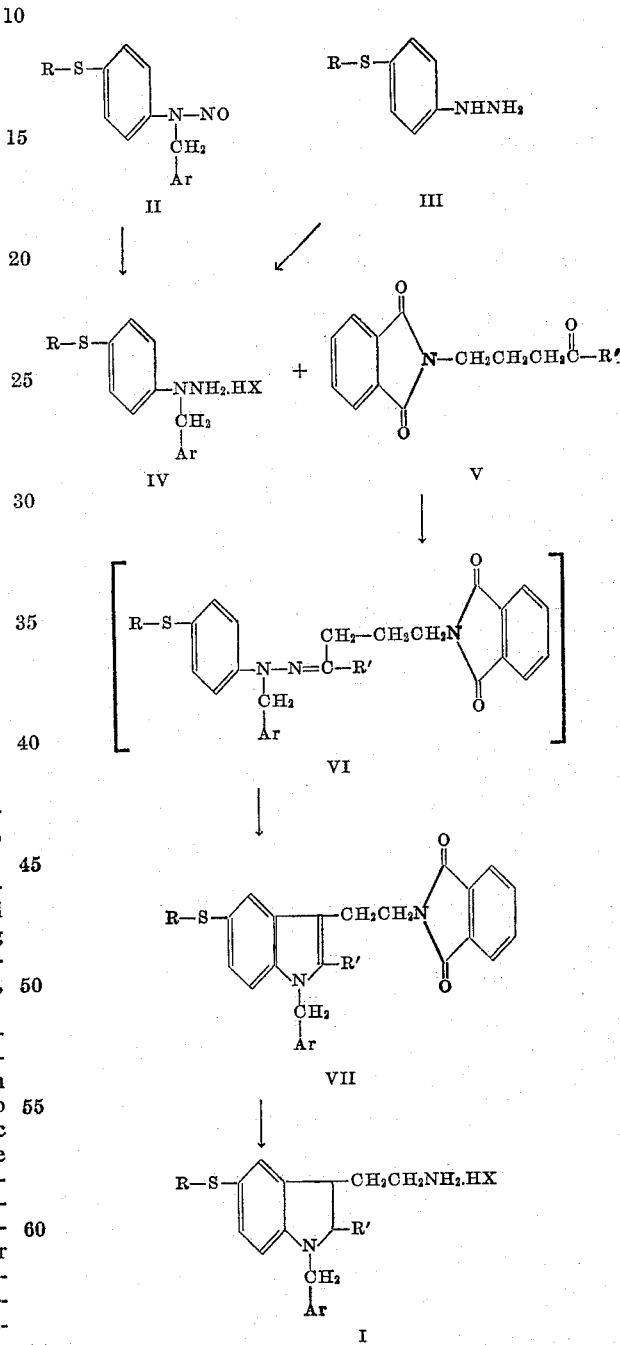

The N-monocarbocyclic arylmethyl-4-lower-alkylmercapto-N-nitrosoanilines of Formula II which are required for the preparation of the intermediate 1-(monocarbocyclic arylmethyl) - 1 - (4-lower-alkylmercaptophenyl)-hydrazines of Formula IV were prepared by reacting a monocarbocyclic aryl aldehyde with a 4-lower-alkylmercaptoaniline to give a Schiff base, in each case, which was then reduced with lithium aluminum hydride. The resulting N-monocarbocyclic arylmethyl - 4 - lower-alkylmercaptoanilines were treated with sodium nitrite in acid medium to give the desired N-monocarbocyclic aryl-methyl-4-lower-alkylmercapto - N - nitrosoanilines.

The intermediate 1-(monocarbocyclic arylmethyl)-1-(4-lower-alkylmercaptophenyl)hydrazines of structure IV are prepared by reacting N-monocarbocyclic arylmethyl-4-lower-alkylmercapto-N-nitrosoanilines of Formula II with zinc and acetic acid in an appropriate solvent. It is preferred that the reaction be carried out in a mixture containing Cellosolve, water and glacial acetic acid at an approximate ratio of 3:1:1, respectively, and at a temperature between about 25° C. and about 30° C.

Another method for preparing the intermediate hydrazines of Formula IV comprises reacting a 4-lower-alkylmercaptophenylhydrazine of Formula III with an alkali metal amide and a monocarbocyclic arylmethyl halide in liquid ammonia in the presence of a catalyst such as ferric salts, iron powder or ferric oxide. A preferred alkali metal amide is sodamide although amides of other alkali metals may be used as well.

The 1-(monocarbocyclic arylmethyl)-1-(4-lower-alkylmercaptophenyl)hydrazines thus prepared are reacted with phthalimidobutyraldehyde or phthalimidopropyl ketones of Formula V to produce the intermediate phthal-imidoethylindoles VII. A preferred method comprises heating the phthalimidobutyraldehyde or phthalimidopropyl ketone with an acid-addition salt of the hydrazine, IV, in an appropriate organic solvent at a temperature between about 50° C. and about 150° C. Preferred salts are the salts of sulfuric and hydrochloric acids although salts of lower alkanoic acids can also be used. The reaction is preferably carried out in an organic solvent, inert under the conditions of the reaction such as lower-alkanols, lower-alkoxy-lower-alkanols and lower-alkanoic acids. The preferred solvent is ethanol.

In the course of this reaction, a hydrazone, VI, is first formed which may be isolated or not as desired although it is preferred that the reaction be permitted to proceed to the formation of the phthalimidoethylindole, VII.

The tryptamines of general structure I are prepared from the phthalimidoethylindole by reaction with hydrazine hydrate or by hydrolysis with a mineral acid or an alkali metal hydroxide. A preferred method comprises heating the phthalimidoethylindole with an excess of hydrazine hydrate in an appropriate organic solvent at a temperature between about 60° C. and about 150° C. The reaction is preferably conducted in an organic solvent inert under the conditions of the reaction, for example, lower-alkanols, lower-alkoxy-lower-alkanols and monocarbocyclic aryl hydrocarbons.

The novel compounds of the instant invention are the bases of Formula I and the acid-addition salts of said bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configuration of the bases of my invention but is also representative of the structural entity which is common to all of my compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical puroposed by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can if desired be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new monocarbocyclic arylmethyltryptamines and not in any particular acid moiety or acid anion associated with the salt forms of my compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids such as found, for example, in Beilstein's Organische Chemie, 4th ed., volumes III, IV, IX, X, XIV, XVII, XIX, XXI, XXII, and XXV; organic mono- and polysulfonic and -sulfinic acids such as found, for example in Beilstein volumes VI, XI, XVI, and XXII; organic phosphonic and phosphinic acids such as found, for example, in Beilstein volumes XI and XVI; organic acids of arsenic and antimony such as found, for example, in Beilstein volume XVI; organic heterocyclic carboxylic, sulfonic, and sulfinic acids such as found, for example, in Beilstein volumes XVIII, XXII, and XXV; acidic ion-exchange resins, for example Amberlite® XE–66 resin; and inorganic acids of any acid forming element or combination of elements such as found in Mellor, Comprehensive Treatise on Inorganic and Theoretical Chemistry, Longman's Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts for example boron trifluoride.

Thus appropriate acid-addition salts are those derived from such diverse acids as formic acid, acetic acid, isobutyric acid, α-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic aid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluations of the tryptamine acid-addition salts of my invention have shown that they possess pharmacodynamic properties and, in particular, have hypotensive activity, thus indicating their usefulness in lowering the blood pressure. Toxicity studies on the compounds, given intravenously in the mouse, have shown that the $LD_{50}$ for the compounds is in the range of 17–44 mg./kg. $LD_{50}$ is defined as the lethal dose for 50% of the animals at that particular dose level.

The structures of the compounds of the invention have been established by chemical analysis and by the processes for their preparation, which can only lead to compounds of the assigned structure.

The following examples will further illustrate the invention without the latter being limited thereto.

Example 1

(a) *1-benzyl-1-(4-methylmercaptophenyl)hydrazine hydrochloride* [IV; $R=CH_3$, $Ar=C_6H_5$].—One crystal of ferric nitrate was added to 250 cc. of liquid ammonia. To the mixture was added 3.1 g. (0.136 mole) of sodium in small pieces and the mixture stirred for one hour. 4-methylmercaptophenylhydrazine (17.2 g.; 0.113 mole) was added over a period of five minutes and the reaction mixture was stirred for one hour. Seventeen grams (0.136 mole) of benzyl chloride were then added dropwise over a period of ten minutes. The mixture was stirred an additional hour and allowed to stand overnight. The reaction mixture, from which all ammonia had evaporated, was treated with ethanol and then with water and ether. The ether layer was separated and washed with water, filtered and treated with an excess of alcoholic hydrochloric acid. The precipitated hydrochloride which separated was collected and dried to give 23.0 g. (72%), M.P., 160°–165° C. A small sample recrystallized twice from absolute ethanol afforded 1-benzyl-1-(4-methylmercaptophenyl)hydrazine hydrochloride of M.P. 174°–175° C.

*Analysis.*—Calcd. for $C_{14}H_{16}N_2S\cdot HCl$: N, 9.98. Found N, 9.97.

(b) *1-(2-chlorobenzyl)-1-(4-methylmercaptophenyl)-hydrazine hydrochloride* [IV; $R=CH_3$, $Ar=2-ClC_6H_4$] was prepared by reacting 4-methylmercaptophenylhydrazine with o-chlorobenzyl chloride in the presence of sodamide according to the manipulative procedure described above in Example 1(a). 1-(2-chlorobenzyl)-1-(4-methylmercaptophenyl)hydrazine hydrochloride was obtained in 88% yield, M.P. 188°–190° C.

*Analysis.*—Calcd. for $C_{14}H_{15}ClN_2S\cdot HCl$: N, 8.89. Found: N, 8.88.

(c) *1-(3,4-dichlorobenzyl)-1-(4-methylmercaptophenyl)hydrazine hydrochloride* [IV; $R=CH_3$, $Ar=3,4-Cl_2C_6H_3$] was prepared by reacting 4-methylmercaptophenylhydrazine with 3,4-dichlorobenzyl chloride in the presence of sodamide according to the manipulative procedure described above in Example 1(a). 1-(3,4-dichlorobenzyl) - 1 - (4 - methylmercaptophenyl)hydrazine hydrochloride was obtained in 61% yield, M.P. 152°–154° C.

*Analysis.*—Calcd. for $C_{14}H_{14}Cl_2N_2S\cdot HCl$: N, 8.01. Found: N, 8.16.

(d) *1-(2,4-dichlorobenzl)-1-(4-methylmercaptophenyl)hydrazine hydrochloride*

[IV; $R=CH_3$, $Ar=2,4-Cl_2C_6H_3$]

was prepared by reacting 4-methylmercaptophenylhydrazine with 2,4-dichlorobenzyl chloride in the presence of sodamide according to the manipulative procedure described above in Example 1(a). 1-(2,4-dichlorobenzyl)-1-(4-methylmercaptophenyl)hydrazine hydrochloride was obtained in 54% yield.

(e) *1-(4-chlorobenzyl)-1-(4-methylmercaptophenyl)-hydrazine hydrochloride* [IV; $R=CH_3$, $Ar=4-ClC_6H_4$] was prepared by reacting 4-methylmercaptophenylhydrazine with 4-chlorobenzyl chloride in the presence of sodamide according to the manipulative procedure described above in Example 1(a). 1-(4-chlorobenzyl)-1-(4-methylmercaptophenyl)hydrazine hydrochloride was obtained in 42% yield, M.P. 166°–168° C.

Example 2

(a) *1-benzyl-1-(4-methylmercaptophenyl)hydrazine hydrochloride* [IV; $R=CH_3$, $Ar=C_6H_5$].—Thirty-two grams (0.106 mole) of N-benzyl-4-methylmercapto-N-nitrosoaniline, prepared by lithium aluminum hydride reduction and subsequent nitrosation of the Schiff base resulting from benzaldehyde and 4-methylmercaptoaniline, were slurried with 400 cc. of Cellosolve and 150 cc. of water. Sixty grams (0.92 atom) of zinc dust were added in three portions and 150 cc. of glacial acetic acid were added dropwise over a period of one and a half hours during which time the temperature was maintained at 25°–30° C. The mixture was stirred for one additional hour, filtered and the filtrate evaporated to dryness. The residue was made basic with aqueous sodium hydroxide and extracted with ether. The ether extracts were dried over calcium sulfate and an excess of alcoholic hydrochloric acid added. The 1-benzyl-1-(4-methylmercaptophenyl)hydrazine hydrochloride which separated was collected and dried to give 20g. (88%).

(b) *1-(2 - chlorobenzyl)-1-(4-methylmercaptophenyl)-hydrazine hydrochloride* [IV; $R=CH_3$, $Ar=2-ClC_6H_4$].—N-2-chlorobenzyl-4-methylmercapto-N-nitrosoaniline, prepared by lithium aluminum hydride reduction and subsequent nitrosation of the Schiff base resulting from 2-chlorobenzaldehyde and 4-methylmercaptoaniline, dissolved in Cellosolve, was reduced with zinc dust and acetic acid according to the manipulative procedure described above in Example 2(a) to give 1-(2-chlorobenzyl)-1-(4-methylmercaptophenyl)hydrazine hydrochloride in 46% yield.

(c) *1 - (4 - methylbenzyl) - 1 - (4 - methylmercaptophenyl)hydrazine hydrochloride*

[IV; R=CH$_3$, Ar=4—CH$_3$C$_6$H$_4$].—

N - 4 - methylbenzyl - 4 - methyl - mercapto - N - nitrosoaniline, prepared by lithium alumium hydride reduction and subsequent nitrosation of the Schiff base resulting from 4-methylbenzaldehyde and 4-methylmercaptoaniline, dissolved in ethanol, was reduced with zinc dust and acetic acid according to the manipulative procedure described above in Example 2(a) to give 1-(4-methylbenzyl)-1-(4-methylmercaptophenyl)hydrazine hydrochloride in 37% yield, M.P. 156–163° C.

(d) *1 - (3,4 - methylenedioxybenzyl) - 1 - (4 - methylmercaptophenyl)-hydrazine hydrochloride*

[IV; R=CH$_3$, Ar=3,4-CH$_2$O$_2$C$_6$H$_3$].—

3,4 - methylenedioxybenzyl - 4 - methylmercapto - N-nitrosoaniline, prepared by lithium aluminum hydride reduction and subsequent nitrosation of the Schiff base resulting from 3,4-methylenedioxybenzaldehyde and 4-methylmercaptoaniline, was slurried with 400 ml. of Cellosolve and 150 ml. of water and reduced with zinc dust and glacial acetic acid according to the manipulative procedure described above in Example 2(a). 1-(3,4-methylenedioxybenzyl) - 1 - (4 - methylmercaptophenyl)-hydrazine hydrochloride was obtained in 76% yield.

Other 1-benzyl-1-phenylhydrazines can be produced by repeating either of the above two methods of preparation, observing of the same conditions for conducting the process by substituting in Example 2(a), for instance, a molar equivalent amount of an N-benzyl-4-lower-alkylmercapto-N-nitrosoaniline for the N-benzyl-4-methylmercapto-N-nitrosoaniline used therein. Thus, in Example 2(a), by using N-benzyl-4-ethylmercapto-N-nitrosoaniline, N-benzyl-4-n-propylmercapto-N-nitrosoaniline, N - benzyl - 4 - isopropylmercapto - N - nitrosoaniline, N - benzyl - 4 - n - butylmercapto - N - nitrosoaniline or N - benzyl - 4 - isobutylmercapto - N - nitrosoaniline, there can be obtained, respectively, 1-benzyl-1-(4-ethylmercaptophenyl)hydrazine hydrochloride

[IV; R=C$_2$H$_5$, Ar=C$_6$H$_5$]

1 - benzyl - 1 - (4 - n - propylmercaptophenyl)hydrazine hydrochloride [IV; R=n—C$_3$H$_7$] 1-benzyl-1-(4-isopropylmercaptophenyl)hydrazine hydrochloride

[IV; R=iso—C$_3$H$_7$]

1 - benzyl - 1 - (4 - n - butylmercaptophenyl)hydrazine hydrochloride (IV; R=n—C$_4$H$_9$) or 1-benzyl-1-(4-isobutylmercaptophenyl)hydrazine hydrochloride

[IV; R=iso—C$_4$H$_9$]

Similarly, other 1-benzyl-1-phenylhydrazines can be produced by substituting in Example 1(a), for instance, substituted-benzyl halides for the benzyl chloride used therein. Thus in Example 1(a) by replacement of the benzyl chloride by a molar equivalent amount of 4-methoxybenzyl chloride, 4-methylmercaptobenzyl chloride, 4-nitrobenzyl chloride, 4-hydroxybenzyl chloride, 4-acetoxybenzyl chloride, 3,4-methylenedioxybenzyl chloride or 3,4,5-trimethoxybenzyl chloride, there can be obtained, respectively, 1 - (4 - methoxybenzyl) - 1 - (4 - methylmercaptophenyl)hydrazine hydrochloride

[IV; R=CH$_3$, Ar=4—CH$_3$OC$_6$H$_4$]

1 - (4 - methylmercaptobenzyl) - 1 - (4 - methylmercaptophenyl)hydrazine hydrochloride

[IV; Ar=4—CH$_3$SC$_6$H$_4$]

1 - (4 - nitrobenzyl) - 1 - (4 - methylmercaptophenyl)-hydrazine hydrochloride [IV; Ar=4—O$_2$NC$_6$H$_4$], 1 - (4- hydroxybenzyl)-1-(4 - methylmercaptophenyl)hydrazine hydrochloride

[IV; Ar=4—HOC$_6$H$_4$]

1 - (4 - acetoxybenzyl) - 1 - (4 - methylmercaptophenyl)-hydrazine hydrochloride [IV; Ar=4—CH$_3$COOC$_6$H$_4$], 1 - (3,4 - methylenedioxybenzyl) - 1 -(4 - methylenemercaptophenyl)hydrazine hydrochloride

[IV; Ar=3,4—CH$_2$O$_2$C$_6$H$_3$]

or 1 - (3,4,5 - trimethoxybenzyl) - 1 - (4 - methylmercaptophenyl)hydrazine hydrochloride

[IV; Ar=3,4,5—(CH$_3$O)$_3$C$_6$H$_2$]

*Example 3*

(a) γ - *Phthalimidobutyraldehyde* [V; R'=H].—Stannous chloride (106 g., 0.53 mole) was suspended in 900 ml. of anhydrous ether and the mixture saturated with gaseous hydrogen chloride. Seventy-five grams (0.35 mole) of γ-phthalimidobutyronitrile were then added and the mixture stirred for two hours while bubbling in hydrogen chloride. The solid was collected and dried to give 161 g. (96%) of the intermediate stannic aldimonium chloride, part of which (138 g., 0.29 mole) was refluxed with 900 ml. of water for about ten minutes. The mixture was cooled and the oil which separated was extracted with ether. After drying, the ether was removed leaving 50 g. (80%) of γ-phthalimidobutyraldehyde as an oil.

(b) *3-phthalimidopropyl methyl ketone*

[V; R'=CH$_3$].—

Potassium phthalimide (205 g.; 1.1 moles) was slurried in 1 liter of gently refluxing dimethylformamide. 3-chloropropyl methyl ketone (123 g.; 1.02 moles) was added dropwise over a period of one hour. Refluxing was continued for one hour and the mixture was then poured into 2 liters of ice and water. The tan solid which separated was collected, dried and washed twice with 300 ml. portions of boiling benzene, filtering after each washing. The filtrate was concentrated to an oil which was decanted from some solid which was present. The oil on cooling solidified to give 102 g. of 3-pthalimidopropyl methyl ketone.

By replacement of the 3-chloropropyl methyl ketone by a molar equivalent amount of 3-chloropropyl ethyl ketone, 3-chloropropyl propyl ketone, 3-chloropropyl isopropyl ketone, 3-chloropropyl butyl ketone or 3-chloropropyl isobutyl ketone there can be obtained, respectively, 3-phthalimidopropyl ethyl ketone [V; R'=C$_2$H$_5$], 3-phthalimidopropyl propyl ketone [V; R'=n—C$_3$H$_7$], 3-phthalimidopropyl isopropyl ketone [V; R'=iso-C$_3$H$_7$], 3-phthalimidopropyl butyl ketone [V; R'=n—C$_4$H$_9$], or 3-phthalimidopropyl isobutyl ketone [V; R'=n—C$_4$H$_9$].

(c) *3-phthalimidopropyl phenyl ketone*

[V; R'=C$_6$H$_5$].—

Sixteen grams (0.064 mole) of γ-phthalimidobutyroyl chloride were dissolved in 100 ml. anhydrous benzene. To the solution was added 16 g. (0.12 mole) of anhydrous aluminum chloride in portions over a period of ten minutes. The mixture was refluxed for two hours, cooled, treated with 100 ml. of dilute (1:3) hydrochloric acid and the excess benzene steam distilled. A yellow oil which separated from the acid aqueous medium solidified upon cooling. One recrystallization from 50% ethanol and one recrystallization from 95% ethanol afforded 6 g. (32%) of 3-pthalimidopropyl phenyl ketone, M.P. 125°–130° C.

By substituting in the above procedure another solvent inret under the conditions of the reaction such as carbon disulfide or carbon tetrachloride and by substituting for the benzene used therein a quantity of chlorobenzene, toluene, methoxybenzene, methylmercaptobenzene, phenylacetate, 1,2-methylenedioxybenzene, or 1,2,3-trimethoxybenzene, equivalent to the amount of phthalimidobutyroyl chloride used, there can be obtained, respectively, 3-phthalimido propyl 4-chlorophenyl ketone [V; R'=4-ClC$_6$H$_4$], 3-phthalimidopropyl 4-methylphenyl ketone [V; R'=4-CH$_3$C$_6$H$_4$], 3-phthalimidopropyl 4-methoxyphenyl ketone [V; R'=4-CH$_3$OC$_6$H$_4$], 3-phthalimidopropyl 4-methylmercaptophenyl ketone

[V; R'=4-CH$_3$SC$_6$H$_4$]

3-phthalimidopropyl 4-acetoxyphenyl ketone

[V; R'=4-CH$_3$COOC$_6$H$_4$]

3 - phthalimidopropyl 3,4 - methylenedioxyphenyl ketone [V; R'=3,4-CH$_2$O$_2$C$_6$H$_3$], or 3-phthalimidopropyl 3,4,5-trimethoxyphenyl ketone [V; R'=3,4,5-(CH$_3$O)$_3$C$_6$H$_2$]. The 3-phthalimidopropyl 4-acetoxyphenyl ketone [V; R'=4-CH$_3$COOC$_6$H$_4$] so produced can be further hydrolyzed to give 3-phthalimidopropyl 4-hydroxyphenyl ketone [V; R'=4-HOC$_6$H$_4$].

Example 4

1-benzyl-2-methyl-5-methylmercapto-3-phthalimidoethylindole [VII; R and R'=CH$_3$, Ar=C$_6$H$_5$].—Ninteen grams (0.068 mole) of 1-benzyl-1-(4-methylmercaptophenyl)hydrazine hydrochloride and 24.1 g. (0.12 mole) of 3-phthalimidopropyl methyl ketone were dissolved in 200 ml. of absolute alcohol and the solution heated under reflux for two hours. The product which had separated from the hot solution was collected to give 19 g., M.P. 150°–154° C. A second crop of 9 g., M.P. 140°–147° C. was obtained from the cooled filtrate. Both crops were combined, boiled with 200 ml. of water, filtered, washed with boiling water and recrystallized from dioxane and 50% alcohol to give 19.5 g. (65%) of 1-benzyl-2-methyl-5 - methylmercapto - 3 - phthalimidoethylindole as yellow needles, M.P. 149°–151° C. (uncorr.).

Analysis.—Calcd. for C$_{27}$H$_{24}$N$_2$O$_2$S: N, 6.36. Found: N, 6.31.

Example 5

1 - (2 - chlorobenzyl) - 2 - methyl - 5 - methylmercapto-3-phthalimidoethylindole [VII; R and R'=CH$_3$, Ar=2-Cl$_2$C$_6$H$_3$].—1-(2,4-dichlorobenzyl)-1-(4-methylmercaptophenyl)hydrazine hydrochloride was reacted with 3-phthalimidopropyl methyl ketone in absolute ethanol according to the manipulative procedure described above in Example 4. 1-(2-chlorobenzyl)-2-methyl-5-methylmercapto-3-phthalimidoethylindole was obtained in 93% yield, M.P. 170°–173° C. (uncorr.). A small amount recrystallized from Cellosolve gave material of M.P. 165°–167° C. (uncorr.).

Analysis.—Calcd. for C$_{27}$H$_{23}$ClN$_2$O$_2$S: N, 5.91. Found: N, 5.78.

Example 6

1 - (4 - chlorobenzyl) - 2 - methyl - 5 - methylmercapto-3-phthalimidoethylindole [VII; R and R'=CH$_3$, Ar=4-ClC$_6$H$_4$].—1-(4-chlorobenzyl) - 1 - (4 - methylmercaptophenyl)hydrazine hydrochloride was reacted with 3-phthalimidopropyl methyl ketone in absolute ethanol according to the manipulative procedure described above in Example 4. 1-(4 - chlorobenzyl)-2-methyl-5-methylmercapto-3-phthalimidoethylindole was obtained in 90% yield. A small amount recrystallized from Cellosolve afforded material of M.P. 150–152° C. (uncorr.).

Analysis.—Calcd. for C$_{27}$H$_{23}$ClN$_2$O$_2$S: N, 5.91. Found: N, 5.82.

Example 7

1-(2,4 - dichlorobenzyl) - 2 - methyl-5-methylmercapto-3-phthalimidoethylindole [VII; R and R'=CH$_3$, Ar=2,4-Cl$_2$C$_6$H$_3$].—1-(2,4 - dichlorobenzyl)-1-(4-methylmercaptophenyl)hydrazine hydrochloride was reacted with 3-phthalimidopropyl methyl ketone in absolute ethanol according to the manipulative procedure described above in Example 4. 1-(2,4-dichlorobenzyl)-2-methyl-5-methylmercapto-3-phthalimidoethylindole was obtained in 94% yield, M.P. 162°–163° C. (uncorr.). A small amount recrystallized from Cellosolve afforded material of M.P. 160°–161° C. (uncorr.).

Analysis.—Calcd. for C$_{27}$H$_{22}$Cl$_2$N$_2$O$_2$S: N, 5.50. Found: N, 5.45.

Example 8

1 - (3,4 - dichlorobenzyl) - 2 - methyl - 5 - methylmercapto-3-phthalimidoethylindole [VII; R and R'=CH$_3$, Ar=3,4-Cl$_2$C$_6$H$_3$].—1 - (3,4 - dichlorobenzyl) - 1 - (4-methylmercaptophenyl)hydrazine hydrochloride was reacted with 3-phthalimidopropyl methyl ketone in absolute ethanol according to the manipulative procedure described above in Example 4. 1-(3,4-dichlorobenzyl)-2-methyl-5-methylmercapto - 3 - phthalimidoethylindole was obtained in 90% yield, M.P. 170°–173° C. (uncorr.). A small amount recrystallized from Cellosolve afforded material of M.P. 171°–173° C. (uncorr.).

Analysis.—Calcd. for C$_{27}$H$_{22}$Cl$_2$N$_2$O$_2$S: N, 5.50. Found: N, 5.44.

Example 9

1-(3,4-methylenedioxybenzyl) - 2 - methyl - 5 - methylmercapto-3-phthalimidoethylindole [VII; R and R'=CH$_3$, Ar=3,4-CH$_2$O$_2$C$_6$H$_3$].—1-(3,4 - methylenedioxybenzyl)-1-(4-methylmercaptophenyl)hydrazine hydrochloride was reacted with 3-phthalimidopropyl methyl ketone in absolute ethanol according to the manipulative procedure described above in Example 4. The crude material was boiled with three portions of water, recrystallized once from Cellosolve, slurried with 100 ml. of boiling ethanol, filtered, washed again with two 50 ml. portions of hot ethanol, and dried to give 1-(3,4-methylenedioxybenzyl) - 2 - methyl-5-methylmercapto-3-phthalimidoethylindole in 54% yield, M.P. 145°–147° C. (uncorr.).

Analysis.—Calcd. for C$_{28}$H$_{24}$N$_2$O$_4$S: N, 5.78. Found: N, 5.73.

Example 10

1-(2-chlorobenzyl) - 2 - phenyl - 5 - methylmercapto-3-phthalimidoethylindole [VII; R=CH$_3$, R'=C$_6$H$_5$, Ar=2-ClC$_6$H$_4$].—1-(2 - chlorobenzyl) - 1 - (4-methylmercaptophenyl)hydrazine hydrochloride was reacted with 3-phthalimidopropyl phenyl ketone in absolute ethanol according to the manipulative procedure described above in Example 4. The crude product, M.P. 195°–197° C. (uncorr.), was boiled in water, filtered, washed several times with water and recrystallized from Cellosolve to give 1-(2-chlorobenzyl)-2-phenyl - 5 - methylmercapto-3-phthalimidoethyl indole, M.P. 195°–198° C. (uncorr.).

Analysis.—Calcd. for C$_{32}$H$_{25}$ClN$_2$O$_2$S: N, 5.22. Found: N, 5.15.

Example 11

1-(2-chlorobenzyl)-5-methylmercapto - 3 - phthalimidoethylindole [VII; R=CH$_3$, R'=H, Ar=2-ClC$_6$H$_4$].—1-(2-chlorobenzyl)-1-(4 - methylmercaptophenyl)hydrazine hydrochloride was reacted with γ-phthalimidobutyraldehyde in absolute ethanol according to the manipulative procedure described above in Example 4. The crude material was recrystallized twice from Cellosolve, washed once with hot ethanol and dried to give 1-(2-chlorobenzyl)-5-methylmercapto - 3 - phthalimidoethylindole, M.P., 137°–139° C. (uncorr.).

Analysis.—Calcd. for C$_{26}$H$_{21}$ClN$_2$O$_2$S: N, 6.08. Found: N, 5.96.

Other 1-substituted benzyl-2-methyl-5-lower-alkylmercapto-3-phthalimidoethylindoles can be produced by repeating the procedure used in Example 4, observing the same conditions for conducting the process by substituting a molar equivalent amount of a 1-(substituted-benzyl)-1-(4 - lower-alkylmercaptophenyl)hydrazine hydrochloride for the 1-benzyl-1-(4-methylmercaptophenyl)hydrazine hydrochloride used therein. Thus in Example 4, by using 1-benzyl-1-(4-ethylmercaptophenyl)hydrazine hydrochloride [IV; R=C$_2$H$_5$, Ar=C$_6$H$_5$], 1-benzyl-1 - (4 - n-propylmercaptophenyl)hydrazine hydrochloride [IV; R=n-C$_3$H$_7$, Ar=C$_6$H$_5$], 1-benzyl-1-(4-isopropylmercaptophenyl)hydrazine hydrochloride [IV; R=iso-$C_3H_5$], 1-benzyl-1-(4-n-butylmercaptophenyl)hydrazine hydrochloride [IV; R=n-$C_4H_9$, Ar=$C_6H_5$], 1-benzyl-1-(4-isobutylmercaptophenyl)hydrazine hydrochloride [IV; R=iso-$C_4H_9$, R=$C_6H_5$], 1-(4-methylbenzyl)-1-(4-methylmercaptophenyl)hydrazine hydrochloride [IV; R=$CH_3$, Ar=4-$CH_3SC_6H_4$], 1-(4-nitrobenzyl)-1-(4-methylmercaptophenyl)hydrazine hydrochloride [IV; R=$CH_3$, Ar=4-$CH_3OC_6H_4$], 1-(4-methylmercaptobenzyl)-1-(4-methylmercaptophenyl)hydrazine hydrochloride [IV; R=$CH_3$, Ar=4-$CH_3SC_6H_4$], 1-(4-nitrobenzyl)-1-(4-methylmercaptophenyl)-hydrazine hydrochloride [IV; R=$CH_3$, Ar=4-$O_2NC_6H_4$], 1-(4-hydroxybenzyl)-1-(4-methylmercaptophenyl)hydrazine hydrochloride [IV; R=$CH_3$, Ar=4-$HOC_6H_4$], 1-(4-acetoxybenzyl)-1-(4-methylmercaptophenyl)hydrazine hydrochloride [IV; R=$CH_3$, Ar=4-$CHC_3OOC_6H_4$], 1-(3,4-methylendioxybenzyl)-1-(4-methylmercaptophenyl)hydrazine hydrochloride [IV; R=$CH_3$, Ar=3,4-$CH_2O_2C_6H_3$], or 1-(3,4,5-trimethoxybenzyl)-1-(4-methylmercaptophenyl)hydrazine hydrochloride [IV; R=$CH_3$, Ar=3,4,5-$(CH_3O)_3C_6H_2$]

there can be obtained, respectively, 1-benzyl-2-methyl-5-ethylmercapto-3-phthalimidoethylindole [VII; R=$C_2H_5$, Ar=$C_6H_5$, R'=$CH_3$], 1-benzyl-2-methyl-5-n-propylmercapto-3-phthalimidoethylindole [VII; R=n-$C_3H_7$, Ar=$C_6H_5$], 1-benzyl-2-methyl-5-isopropylmercapto-3-phthalimidoethylindole [VII; R=iso-$C_3H_7$, Ar=$C_6H_5$], 1-benzyl-2-methyl-5-n-butylmercapto-3-phthalimidoethylindole [VII; R=n-$C_4H_9$, Ar=$C_6H_5$], 1-benzyl-2-methyl-5-isobutylmercapto-3-phthalimidoethylindole [VII; R=iso-$C_4H_9$, Ar=$C_6H_5$], 1-(4-methylbenzyl)-2-methyl-5-methylmercapto-3-phthalimidoethylindole [VII;

R=$CH_3$

Ar=4-$CH_3C_6H_4$], 1-(4-methoxybenzyl)-2-methyl-5-methylmercapto-3-phthalimidoethylindole [VII; R=$CH_3$, Ar=4-$CH_3OC_6H_4$], 1-(4-methylmercaptobenzyl)-2-methyl-5-methylmercapto-3-phthalimidoethylindole [VII; R=$CH_3$, Ar=4-$CH_3SC_6H_4$], 1-(4-nitrobenzyl)-2-methyl-5-methylmercapto-3-phthalimidoethylindole [VII;

R=$CH_3$

Ar=4-$O_2NC_6H_4$], 1-(4-hydroxybenzyl)-2-methyl-5-methylmercapto-3-phthalimidoethylindole [VII; R=$CH_3$, Ar=4-$HOC_6H_4$], 1-(4-acetoxybenzyl)-2-methyl-5-methylmercapto-3-phthalimidoethylindole [VII; R=$CH_3$, Ar=4-$CH_3COOC_6H_4$], 1-(3,4-methylenedioxybenzyl)-2-methyl-5-methylmercapto-3-phthalimidoethylindole [VII; R=$CH_3$, Ar=3,4-$CH_2O_2C_6H_3$] or 1-(3,4,5-trimethoxybenzyl)-2-methyl-5-methylmercapto-3-phthalimidoethylindole [VII; R=$CH_3$, Ar=3,4,5-$(CH_3O)_3C_6H_2$].

By repeating the procedure used in Example 4, observing the same conditions for conducting the process, and by substituting for the 3-phthalimidopropyl methyl ketone used therein a molar equivalent amount of 3-phthalimidopropyl ethyl ketone [V; R'=$C_2H_5$], 3-phthalimidopropyl propyl ketone [V; R'=n-$C_3H_7$], 3-phthalimidopropyl isopropyl ketone [V; R'=iso-$C_3H_7$], 3-phthalimidopropyl butyl ketone [V; R'=n-$C_4H_9$], 3-phthalimidopropyl isobutyl ketone [V; R'=iso-$C_4H_9$], γ-phthalimidobutyraldehyde [V; R'=H], 3-phthalimidopropyl phenyl ketone [V; R'=$C_6H_5$], 3-phthalimidopropyl 4-chlorophenyl ketone [V; R'=4-$ClC_6H_4$], 3-phthalimidopropyl 4-methylphenyl ketone [V; R'=4-$CH_3C_6H_4$], 3-phthalimidopropyl 4-methoxyphenyl ketone [V; R'=4-$CH_3OC_6H_4$], 3-phthalimidopropyl 4-methylmercaptophenyl ketone [V; R'=4-$CH_3SC_6H_4$], 3-phthalimidopropyl 4-acetoxyphenyl ketone [V; R'=4-$CH_3COOC_6H_4$], 3-phthalimidopropyl 3,4-methylenedioxyphenyl ketone [V;

R'=3,4-$CH_2O_2C_6H_3$]

3-phthalimidopropyl 3,4,5-trimethoxyphenyl ketone [V; R'=3,4,5-$(CH_3O)_3C_6H_2$], or 3-phthalimidopropyl 4-hydroxyphenyl ketone [V; $R_2$=4-$HOC_6H_4$] there can be obtained, respectively, 1-benzyl-2-ethyl-5-methylmercapto-3-phthalimidoethylindole [VII; R'=$C_2H_5$, R=$CH_3$, Ar=$C_6H_5$], 1-benzyl-2-n-propyl-5-methylmercapto-3-phthalimidoethylindole [VII; R'=n-$C_3H_7$], 1-benzyl-2-isopropyl-5-methylmercapto-3-phthalimidoethylindole [VII; R'=iso-$C_3H_7$], 1-benzyl-2-n-butyl-5-methylmercapto-3-phthalimidoethylindole [VII; R'=n-$C_4H_9$], 1-benzyl-2-isobutyl-5-methylmercapto-3-phthalimidoethylindole [VII; R'=iso-$C_4H_9$], 1-benzyl-5-methylmercapto-3-phthalimidoethylindole [VII; R'=H], 1-benzyl-2-phenyl-5-methylmercapto-3-phthalimidoethylindole [VII; R'=$C_6H_5$], 1-benzyl-2-(4-chlorophenyl)-5-methylmercapto-3-phthalimidoethylindole [VII; R'=4-$ClC_6H_4$], 1-benzyl-2-(4-methylphenyl)-5-methylmercapto-3-phthalimidoethylindole [VII; R'=4-$CH_3C_6H_4$], 1-benzyl-2-(4-methoxyphenyl)-5-methylmercapto-3-phthalimidoethylindole [VII; R'=4-$CH_3OC_6H_4$], 1-benzyl-2-(4-methylmercaptophenyl)-5-methylmercapto-3-phthalimidoethylindole [VII; R'=4-$CH_3SC_6H_4$], 1-benzyl-2-(4-acetoxyphenyl)-5-methylmercapto-3-phthalimidoethylindole [VII; R'=4-$CH_3COOC_6H_4$], 1-benzyl-2-(3,4-methylenedioxyphenyl)-5-methylmercapto-3-phthalimidoethylindole [VII; R'=3,4-$CH_2O_2C_6H_3$], 1-benzyl-2-(3,4,5-trimethoxyphenyl)-5-methylmercapto-3-phthalimidoethylindole [VII; R'=3,4,5-$(CH_3O)_3C_6H_2$], or 1-benzyl-2-(4-hydroxyphenyl)-5-methylmercapto-3-phthalimidoethylindole [VII; R'=4-$HOC_6H_4$].

Example 12

*1-benzyl-2-methyl-5 5-methylmercaptotryptamine hydrochloride* [I; R=$CH_3$, R'=$CH_3$, Ar=$C_6H_5$].—Eighteen grams (0.042 mole) of 1-benzyl-2-methyl-5-methylmercapto-3-phthalimido ethylindole were dissolved in 50 ml. of Cellosolve by boiling. To the boiling solution was added 7.8 ml. (0.129 mole) of 85% hydrazine hydrate. The mixture was refluxed for forty-five minutes, diluted with about 110 ml. of water, acidified with dilute hydrochloric acid, heated to boiling and filtered. The filtrate was cooled to about 5° C. and the crude hydrochloride which had separated was collected. It was recrystallized once from water, once from ethanol and once from methanol-ether to give 5.0 g. of 1-benzyl-2-methyl-5-methylmercaptotryptamine hydrochloride, M.P. 198°–200° C. (uncorr.).

*Analysis.*—Calcd. for $C_{19}H_{22}N_2S \cdot HCl$: Cl, 10.22; N, 8.08. Found: Cl, 10.10; N, 8.02.

The minimum effective hypotensive dose of 1-benzyl-2-methyl-5-methylmercaptotrytamine hydrochloride given subcutaneously in the renal hypertensive rat was found to be 0.0158 mg./kg. Given orally in the unanesthetized dog at a dose level of 10.0 mg./kg., it produced a 27% decrease in the heart rate and an 8% drop in blood pressure. The hypotensive effect had a duration of 220 minutes, and the maximum drop in blood pressure was reached in 175 minutes. Toxicity studies in the mouse have shown the oral $ALD_{50}$ to be 1250 mg./kg. where $ALD_{50}$ is the average lethal dose for 50% of the animals at that dose level.

1-benzyl-2-methyl-5-methylmercaptotryptamine reacts with formic acid, acetic acid, isobutyric acid, α-mercaptopropionic acid, malic acid, fumaric acid, succinic acid, succinamic acid, tartaric acid, citric acd, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methansulfonic acid, isethionic acid, benzenesulfonic acid, p-toluenesulfonic acid, benzenesulfinic acid, methylphosphonic acid, phenylphosphinic acid, phenylarsinic acid, phenylstibnic acid, phenylphosphinous acid, methylphosphonic acid, phenylphosphonic acid, Amberlite ® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, α-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diehylphosphinate, p-aminophenylarsinate, phenylstibnate, phenylphosphiniae, methylphosphonate, phenylphosphinate, Amberlite ® XE–66 resin salt, hydrofluoride, hydrochloride, hydrobromide, hydroiodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

1-benzyl-2-methyl-5-methylmercaptotryptamine can be reacted with hydriodic acid to form 1-benzyl-2-methyl-5-methylmercaptotryptamine hydriodide, useful as a characterizing intermediate.

1-benzyl-2-methyl-5-methylmercaptotryptamine in the form of its hydriodide salt can be converted to the hydrochloride salt by passing an aqueous solution of the former over an ion-exchange resin saturated with chloride ions, for example, Rohm and Haas' Amberlite ® IRA–400 resin.

1-benzyl-2-methylmercaptotryptamine can be converted to its hydriodide salt and the latter recrystallized for purification purposes from an appropriate organic solvent. On suspension of the hydriodide in dilute aqueous sodium hydroxide, extraction of the suspension with CHCl₃, and removal of the chloroform from the extracts, 1-benzyl-2-methylmercaptotrytpamine can be recovered in purified free base form.

*Example 13*

1-(2-chlorobenzyl) - 2 - methyl - 5 - methylmercaptotryptamine hydrochloride

[I; R=CH₂, R'=CH₃, Ar=2=Cl₆H₄]

was prepared by reacting 1(-2-chlorobenzyl)-2-methyl-5-methylmercapto-3-phthalimidoethylindole with 85% hydrazine hydrate in Cellosolve according to the manipulative procedure described above in Example 12. The mixture was cooled and ether added. The solid which remained undissolved was removed by filtration and the filtrate was concentrated. The residue was dissolved in absolute ethanol and the solution treated with an excess of alcoholic hydrochloric acid. The solid hydrochloride salt which separated was collected and recrystallized from methanol to give 1-(2-chlorobenzyl)-2-methyl-5-methylmercaptotryptamine hydrochloride, M.P. 197.8°–199.8° C. (corr.).

*Analysis.*—Calcd. for $C_{19}H_{21}ClN_2S \cdot HCl$: Cl, 18.64; N, 7.37. Found: Cl, 18.91; N, 7.26.

The minimum effective hydotensive dose of 1-(2-chlorobenzyl)-2-methyl - 5 - methylmercaptotryptamine hydrochloride given subcutaneously in the renal hypertensive rat was found to be 0.004 mg./kg. Given orally in the unanesthetized dog at a dose level of 10.0 mg./kg., it produced a 10% decrease in the heart rate and an 8% drop in blood pressure. The hypotensive effect had a duration of 140 minutes, and the maximum drop in blood pressure was reached in 73 minutes. Toxicity studies in the mouse have shown the LD₅₀ to be 560±155 (oral administration).

*Example 14*

1 - (4 - chlorobenzyl)-2-methyl-5-methylmercaptotryptamine hydrochloride [I; R=CH₃, R'=CH₃, Ar=ClC₆H₄] was prepared by reacting 1-(4-chlorobenzyl)-2-methyl-5-methylmercapto-3-phthalimidoethylindole with 85% hydrazine hydrate in Cellosolve according to the manipulative procedure described above in Example 13. After recrystallizing from methanol, there was obtained 1-(4-chlorobenzyl)-2-methyl-5-methylmercaptotryptamine hydrochloride, M.P. 197.6°–202.6° C. (corr.).

*Analysis.*—Calcd. for $C_{19}H_{21}ClN_2S \cdot HCl$: Cl, 18.64; N, 7.37. Found: Cl, 18.78; N, 7.21.

The minimum effective hypotensive dose of 1-(4-chlorobenzl)-2-methyl-5-methylmercaptotryptamine hydrochloride given subcutaneously in the renal hypertensive rat was found to be 1.0 mg./kg. Given orally in the unanesthetized dog at a dose level of 10.0 mg./kg. it produced a 25% decrease in the heart rate and an 8% drop in blood pressure. The hypotensive effect had a duration of 195 minutes, and the maximum drop in blood pressure was reached in 103 minutes. Toxicity studies in the mouse have shown the ALD₅₀ to be 31 mg./kg. (intravenous administration).

*Example 15*

1 - (2,4 - dichlorobenzyl) - 2-methyl-5-methylmercaptamine hydrochloride

[I; R=CH₃, R'=CH₃, Ar=2,4—Cl₂C₆H₃]

was prepared by reacting 1-(2,4-dichlorobenzyl)-2-methyl-5-methylmercapto-3-phthalimidoethylindole with 85% hydrazine hydrate in Cellosolve according to the manipulative procedure described above in Example 13. There was thus obtained 1-(2,4-dichlorobenzyl)-2-methyl-5-methylmercaptotryptamine hydrochloride, M.P. 231.4°–233.2° C. (corr.).

*Analysis.*—Calcd. for $C_{19}H_{20}ClN_2S \cdot HCl$: Cl, 25.58; N, 6.74. Found: Cl, 25.27; N, 6.55.

The ALD₅₀ of 1-(2,4-dichlorobenzyl)-2-methyl-5-methylmercaptotryptamine hydrochloride on intravenous administration in the mouse was found to be 11 mg./kg.

*Example 16*

1 - (3,4 - dichlorobenzyl)-2-methyl-5-methylmercaptotryptamine hydrochloride

[I; R=CH₃, R'=CH₃, Ar=3,4—Cl₂C₆H₃]

was prepared by reacting 1-(3,4-dichlorobenzyl)-2-methyl-5-methylmercaptotryptamine-3-phthalimidoethylindole with 85% hydrazine hydrate in Cellosolve according to the manipulative procedure described above in Example 13. After recrystallizing from methanol, there was obtained 1 - (3,4-dichlorobenzyl)-2-methyl-5-methylmercaptotryptamine hydrochloride, M.P. 227.6°–230.6° C. (corr.).

*Analysis.*—Calcd. for $C_{19}H_{20}Cl_2N_2S \cdot HCl$: Cl, 25.58; N, 6.74. Found: Cl, 25.27; N, 6.65.

The minimum effective hypotensive dose of 1-(3,4-dichlorobenzyl)-2-methyl-5-methylmercaptotryptamine hydrochoride given subcutaneously in the renal hypertensive rat was found to be 0.004 mg./kg. Given orally in the unanesthetized dog at a dose level of 10.0 mg./kg., it produced a 12% decrease in the heart rate and a 9% drop in blood pressure. The hypotensive effect had a duration of 270 minutes, and the maximum drop in blood pressure was reached in 78 minutes. The ALD₅₀ in the mouse was found to be 1250 mg./kg. (oral administration).

*Example 17*

1 - (3,4-methylenedioxybenzyl)-2-methyl-5-methylmercaptotryptamine hydrochloride [I; R=CH₃, R'=CH₃, Ar=3,4—CH₂O₂C₆H₃] was prepared by reacting 1-(3,4-methylenedioxybenzyl) - 2 - methyl-5-methylmercapto-3-phthalimidoethylindole with 85% hydrazine hydrate in Cellosolve according to the manipulative procedure described above in Example 13. After recrystallizing from methanol, 1 - (3,4-methylenedioxybenzyl) - 2 - methyl-5-methylmercaptotryptamine hydrochloride was obtained, M.P. 236.4°–238.2° C. (corr.).

*Analysis.*—Calcd. for $C_{20}H_{22}N_2O_2S \cdot HCl$: Cl, 9.07; N, 7.17. Found: Cl, 8.97; N, 7.05.

Given orally in the unanesthetized dog at a dose level of 10.0 mg./kg., it produced a 33% decrease in the heart rate and a 7% drop in blood pressure. The hypotensive effect had a duration of 100 minutes, and the maximum drop in blood pressure was reached in 80 minutes. The $ALD_{50}$ in the mouse was found to be 44 mg./kg. (intravenous administration).

Example 18

*1 - (2-chlorobenzyl)-2-phenyl-5-methylmercaptotryptamine ethanesulfonate*

[I; $R=CH_3$, $R'=C_6H_5$, $Ar=2-ClC_6H_5$]

was prepared by reacting 1-(2-chlorobenzyl)-2-phenyl-5-methylmercapto-3-phthalimidoethylindole with 85% hydrazine hydrate in Cellosolve according to the manipulative procedure described in Example 13. After removal of the solvent, and treatment of the residue with warm 5% sodium hydroxide, the mixture solidified. It was filtered, taken into absolute ethanol and the solution treated with an excess of ethanesulfonic acid. Dry ether was added and the salt which separated was collected and recrystallized from ethanol to give 1-(2-chlorobenzyl)-2-phenyl - 5 - methylmercaptotryptamine ethanesulfonate, M.P. 192.6°–199.8° C. (corr.).

*Analysis.*—Calcd. for $C_{24}H_{23}ClN_2S \cdot C_2H_5SO_3H$: S, 12.40; N, 5.42. Found: S, 12.41; N, 5.34.

Example 19

*1 - (2-chlorobenzyl)-5-methylmercaptotryptamine hydrochloride* [I; $R=CH_3$, $R'=H$, $Ar=2-ClC_6H_4$] was prepared by reacting 1-(2-chlorobenzyl)-5-methylmercapto-3-phthalimidoethylindole with 85% hydrazine hydrate in Cellosolve according to the manipulative procedure described above in Example 13. After recrystallizing from a methanol-ether mixture, 1-(2-chlorobenzyl)-5-methylmercaptotryptamine hydrochloride was obtained, M.P. 188°–196.2° C. (corr.).

*Analysis.*—Calcd. for $C_{18}H_{19}ClN_2S \cdot HCl$: Cl, 19.30; N, 7.63. Found: Cl, 19.62; N, 7.56.

The $ALD_{50}$ of 1-(2-chlorobenzyl)-5-methylmercaptotryptamine hydrochloride on intravenous administration in the mouse was found to be 31 mg./kg.

By repeating the procedure used in Example 13, observing the same conditions for conducting the process, and by substituting for the 1-benzyl-2-methyl-5-methylmercapto-3-phthalimidoethylindole used therein a molar equivalent amount of 1-benzyl-2-methyl-5-ethylmercapto-3-phthalimidoethylindole [VII; $R=C_2H_5$, $R'=CH_3$, $Ar=C_6H_5$], 1 - benzyl-2-methyl-5-n-propylmercapto-3-phthalimidoethylindole [VII; $R=n-C_3H_7$, $R'=CH_3$, $Ar=C_6H_5$], 1 - benzyl-2-methyl-5-isopropylmercapto-3-phthalimidoethylindole [VII; $R=iso-C_3H_7$, $R'=CH_3$, $Ar=C_6H_5$], 1-benzyl - 2 - methyl-5-n-butylmercapto-3-phthalimidoethylindole [VII; $R=n-C_4H_9$, $R'=CH_3$, $Ar=C_6H_5$], 1-benzyl - 2 - methyl-5-isobutylmercapto-3-phthalimidoethylindole [VII; $R=iso-C_4H_9$, $R'=CH_3$, $Ar=C_6H_5$], 1 - (4-methylbenzyl)-2-methyl-5-methylmercapto-3-phthalimidoethylindole [VII; $R=CH_3$, $R'=CH_3$, $Ar=4-CH_3C_6H_4$], 1-(4-methoxybenzyl)-2-methyl-5-methylmercapto - 3 - phthalimidoethylindole [VII; $R=CH_3$, $R'=CH_3$, $Ar=4-CH_3OC_6H_4$], 1-(4-methylmercaptobenzyl)-2-methyl-5-methylmercapto - 3 - phthalimidoethylindole [VII; $R=CH_3$, $R'=CH_3$, $Ar=4-CH_3SC_6H_4$], 1-(4-nitrobenzyl) - 2-methyl-5-methylmercapto-3-phthalimidoethylindole [VII; $R=CH_3$, $R'=CH_3$, $Ar=4-O_2NC_6H_4$], 1-(4 - hydroxybenzyl)2 - methyl - 5 - methylmercapto-3-phthalimidoethylindole [VII; $R=CH_3$, $R'=CH_3$, $Ar=4-HOC_6H_4$], 1 - (4-acetoxybenzyl)-2-methyl-5-methylmercapto-3-phthalimidoethylindole [VII; $R=CH_3$, $R'=CH_3$, $Ar=4-CH_3COOC_6H_4$], 1-(3,4-methylenedioxybenzyl)-2-methyl-5-methylmercapto - 3 - phthalimidoethylindole [VII; $R=CH_3$, $R'=CH_3$, $Ar=3,4-CH_2O_2C_6H_3$], 1-(3,4,5-trimethoxybenzyl) - 2 - methyl-5-methylmercapto-3-phthalimidoethylindole [VII; $R=CH_3$, $R'=CH_3$, $Ar=3,4,5-(CH_3O)_3C_6H_2$], 1-benzyl-2-ethyl-5-methylmercapto-3-phthalimidoethylindole

[VII; $R=CH_3$, $R'C_2H_5$, $Ar=C_6H_5$]

1-benzyl-2-n-propyl-5-methylmercapto - 3 - phthalimidoethylindole [VII; $R=CH_3$, $R'=n-C_3H_7$, $Ar=C_6H_5$], 1-benzyl-2-isopropyl-5-methylmercapto - 3 - phthalimidoethylindole [VII; $R=CH_3$, $R'=iso-C_3H_7$, $Ar=C_6H_5$], 1-benzyl-2-n-butyl-5-methylmercapto - 3 - phthalimidoethylindole [VII; $R=CH_3$, $R'=n-C_4H_9$, $Ar=C_6H_5$], 1-benzyl-2-isobutyl-5-methylmercapto-3 - phthalimidoethylindole [VII; $R=CH_3$, $R'=iso-C_4H_9$, $Ar=C_6H_5$], 1-benzyl-5-methylmercapto-3-phthalimidoethylindole [VII; $R=CH_3$, $R'=H$, $Ar=C_6H_5$], 1-benzyl-2-phenyl-5-methylmercapto-3 - phthalimidoethylindole [VII; $R=CH_3$, $R=CH_3$, $R'=H$, $Ar=C_6H_5$], 1-benzyl-2-phenyl-5-methmethylmercapto-3-phthalimidoethylindole [VII; $R=CH_3$, $R'=4-ClC_6H_4$, $Ar=C_6H_5$], 1-benzyl-2-(4-methylphenyl)-5-methylmercapto-3 - phthalimidoethylindole [VII; $R=CH_3$, $R'=4-CH_3C_6H_4$, $Ar=C_6H_5$], 1-benzyl-2-(4-methoxyphenyl)-5-methylmercapto - 3 - phthalimidoethylindole [VII; $R=CH_3$, $R'=4-CH_3OC_6H_4$, $Ar=C_6H_5$], 1-benzyl-2-(4-methylmercaptophenyl)-5-methylmercapto-3-phthalimidoethylindole

[VII; $R=CH_3$, $R'=4-CH_3SC_6H_4$, $Ar=C_6H_5$]

1-benzyl-2-(4-acetoxyphenyl) - 5 - methylmercapto - 3-phthalimidoethylindole

[VII; $R=CH_3$, $R'=4-CH_3COOC_6H_4$, $Ar=C_6H_5$]

1-benzyl-2-(3,4-methylenedioxyphenyl) - 5 - methylmercapto-3-phthalimidoethylindole

[VII; $R=CH_3$, $R'=3,4-CH_2O_2C_6H_3$, $Ar=C_6H_5$]

1-benzyl-2-(3,4,5-trimethoxyphenyl)-5 - methylmercapto-3 - phthalimidoethylindole [VII; $R=CH_3$, $R'=3,4,5-(CH_3O)_3C_6H_2$, $Ar=C_6H_5$], or 1-benzyl-2-(4-hydroxyphenyl)-5 - methylmercapto - 3 - phthalimidoethylindole [VII; $R=CH_3$, $R'=4-HOC_6H_4$, $Ar=C_6H_5$], there can be obtained, respectively, 1-benzyl-2-methyl-5-ethylmercaptotryptamine hydrochloride [I; $R=C_2H_5$, $R'=CH_3$, $Ar=C_6H_5$, $HX=HCl$], 1 - benzyl-2-methyl-5-n-propylmercaptotryptamine hydrochloride [I; $R=n-C_3H_7$, $R'=CH_3$, $Ar=C_6H_5$], 1-benzyl-2-methyl-5-iso propylmercaptotryptamine hydrochloride [I; $R=iso-C_3H_7$, $R'=CH_3$, $Ar=C_6H_5$], 1-benzyl-2-methyl-5-n-butylmercaptotryptamine hydrochloride [I; $R=n-C_4H_9$, $R'=CH_3$, $Ar=C_6H_5$], 1 - benzyl-2-methyl-5-isobutylmercaptotryptamine hydrochloride [I; $R=iso-C_4H_9$, $R'=CH_3$, $Ar=C_6H_5$], 1-(4 - methylbenzyl)-2-methyl-5-methylmercaptotryptamine hydrochloride [I; $R=CH_3$, $R'=CH_3$, $Ar=4-CH_3C_6H_4$], 1-(4 - methoxybenzyl)-2-methyl-5-methylmercaptotryptamine hydrochloride [I; $R=CH_3$, $R'=CH_3$, $Ar=4-CH_3OC_6H_4$], 1-(4-methylmercaptobenzyl)-2-methyl-5 - methylmercaptotryptamine hydrochloride [I; $R=CH_3$, $R'=CH_3$, $Ar=4-CH_3SC_6H_4$], 1-(4-nitrobenzyl)-2-methyl - 5 - methylmercaptotryptamine hydrochloride [I; $R=CH_3$, $R'=CH_3$, $Ar=4-O_2NC_6H_4$], 1-(4-hydroxybenzyl)-2-methyl-5 - methylmercaptotryptamine hydrochloride

[I; $R=CH_3$, $R'=CH_3$, $Ar=4-HOC_6H_4$]

1-(4-acetaxybenzyl)-2-methyl - 5 - methylmercaptotryptamine hydrochloride

[I; $R=CH_2$, $R'=CH_2$, $Ar=4-CH_2COOC_6H_4$]

1-(3,4-methylenedioxybenzyl)-2-methyl - 5 - methylmercaptotryptamine hydrochloride [I; $R=CH_3$, $R'=CH_3$, $Ar=3,4-CH_2O_2C_6H_3$], 1 - (3,4,5 - trimethoxybenzyl)-2-methyl-5-methylmercaptotryptamine hydrochloride [I; $R=CH_3$, $R'=CH_3$, $Ar=3,4,5-(CH_3O)_3C_6H_2$], 1-benzyl- 2-ethyl-5-methylmercaptotryptamine hydrochloride [I; R=CH₃, R'=C₂H₅, Ar=C₆H₅], 1-benzyl-2-n-propyl-5-methylmercaptotryptamine hydrochloride [I; R=CH₃, R'=n—C₃H₇, Ar=C₆H₅], 1-benzyl-2-isopropyl-5-methylmercaptotryptamine hydrochloride

[I; R=CH₃, R'=iso—C₃H₇, Ar=C₆H₅]

1-benzyl-2-n-butyl-5 - methylmercaptotryptamine hydrochloride [I; R=CH₃, R'=n—C₄H₉, Ar=C₆H₅], 1-benzyl-2-isobutyl-5-methylmercaptotryptamine hydrochloride [I; R=CH₃, R'=iso—C₄H₉, Ar=C₆H₅], 1-benzyl-5-methylmercaptotryptamine hydrochloride [I; R=CH₃, R'=H, Ar=C₆H₅], 1 - benzyl-2-phenyl-5-methylmercaptotryptamine hydrochloride [I; R=CH₃, R'=C₆H₅, Ar=C₆H₅], 1-benzyl-2-(4-chlorophenyl)-5-methylmercaptotryptamine hydrochloride [I; R=CH₃, R'=4—ClC₆H₄, Ar=C₆H₅], 1-benzyl-2-(4-methylphenyl) - 5 - methylmercaptotryptamine hydrochloride [I; R=CH₃, R'=4—CH₃C₆H₄, Ar=C₆H₅], 1-benzyl-2-(4-methoxyphenyl)-5-methylmercaptotryptamine hydrochloride

[I; R=CH₃, R'=4—CH₃OC₆H₄, Ar=C₆H₅]

1-benzyl-2-(4-methylmercaptophenyl)-5-methylmercaptotryptamine hydrochloride

[I; R=CH₃, R'=4—CH₃SC₆H₄, Ar=C₆H₅]

1-benzyl-2-(4-acetoxyphenyl) - 5 - methylmercaptotryptamine hydrochloride [I; R=CH₃, R'=4—CH₃COOC₆H₄, Ar=C₆H₅], 1 - benzyl-2-(3,4-methylenedioxyphenyl)-5-methylmercaptotryptamine hydrochloride [I; R=CH₃, R'=3,4—CH₂O₂C₆H₃, Ar=C₆H₅], 1-benzyl-2-(3,4,5-trimethoxyphenyl)-5-methylmercaptotryptamine hydrochloride [I; R=CH₃, R'=3,4,5-(CH₃O)₃C₆H₂, Ar=C₆H₅], or 1-benzyl-2-(4-hydroxyphenyl)-5-methylmercaptotryptamine hydrochloride [I; R=CH₃, R'=4—HOC₆H₄, Ar=C₆H₅].

The compounds of the invention can be formulated for use in the same way as conventional hypotensive agents, such as reserpine preparations, and indeed can be used advantageously in combination with such hypotensive agents. They can be formulated into tablets or capsules for oral administration or dissolved under sterile conditions for parenteral injection.

This application is a continuation-in-part of my prior application S.N. 726,600, filed April 7, 1958, abandoned February 23, 1960.

I claim:
1. A member of the group consisting of (A) compounds of the formula

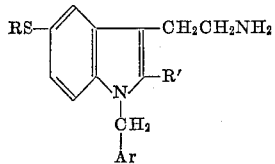

where Ar is a member of the group consisting of phenyl and phenyl substituted by from one to three members of the group consisting of halogen, lower-alkyl, lower-alkoxy, lower-alkylmercapto, nitro, hydroxy, lower-alkanoyloxy, and methylenedioxy; R' is a member of the group consisting of hydrogen, lower-alkyl, phenyl and phenyl substituted by from one to three members of the group consisting of halogen, lower-alkyl, lower-alkoxy, lower-alkylmercapto, hydroxy, lower-alkanoyloxy, and methylenedioxy; and R is lower-alkyl, and (B) acid-addition salts thereof.

2. An acid-addition salt of a compound of the formula

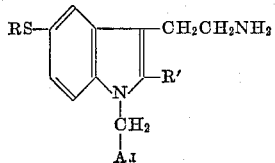

where Ar is halo-phenyl, R' is phenyl and R is lower-alkyl.

3. An acid-addition salt of a compound of the formula

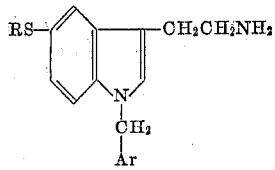

where Ar is halo-substitute-phenyl, and R is lower alkyl.

4. An acid-addition salt of a compound of the formula

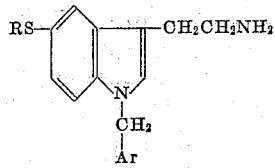

where Ar is lower-alkyl-phenyl, and R is lower-alkyl.

5. An acid-addition salt of a compound of the formula

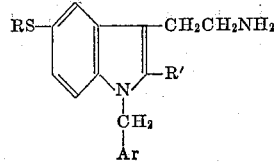

where Ar is phenyl, and R and R' are lower-alkyl.

6. An acid-addition salt of a compound of the formula

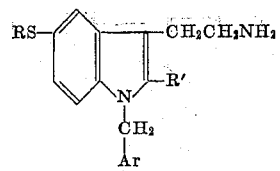

where Ar is halophenyl, and R and R' are lower-alkyl.

7. An acid-addition salt of a compound of the formula

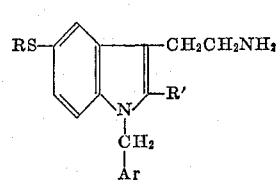

where Ar is methylenedioxyphenyl, and R and R' are lower-alkyl.

8. 1 - (2 - chlorobenzyl)-5-methylmercaptotryptamine hydrochloride.

9. 1 - benzyl - 2-methyl-5-methylmercaptotryptamine hydrochloride.

10. 1 - (2 - chlorobenzyl)-2-methyl-5-methylmercaptotryptamine hydrochloride.

11. 1 - (4 - chlorobenzyl)-2-methyl-5-methylmercaptotryptamine hydrochloride.

12. 1 - (2,4 - dichlorobenzyl)-2-methyl-5-methylmercaptotryptamine hydrochloride.

13. 1 - (3,4 - dichlorobenzyl)-2-methyl-5-methylmercaptotryptamine hydrochloride.

14. 1 - (3,4 - methylenedioxybenzyl) - 2-methyl-5-methylmercaptotryptamine hydrochloride.

15. 1 - (2 - chlorobenzyl) - 2-phenyl-5-methylmercaptotryptamine ethanesulfonate.

16. A compound of the formula

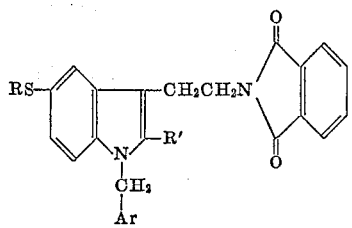

where Ar is a member of the group consisting of phenyl and phenyl substituted by from one to three members of the group consisting of halogen, lower-alkyl, lower-alkoxy, lower-alkylmercapto, nitro, hydroxy, lower-alkanoyloxy, and methylenedioxy; R' is a member of the group consisting of hydrogen, lower-alkyl, phenyl and phenyl substituted by from one to three members of the group consisting of halogen, lower-alkyl, lower-alkoxy, lower-alkylmercapto, hydroxy, lower-alkanoyloxy, and methylenedioxy; and R is lower-alkyl.

17. A compound of the formula

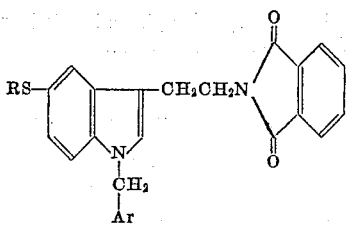

where Ar is halo-substitute-phenyl, and R is lower-alkyl.

18. A compound of the formula

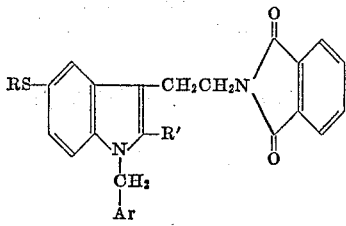

where Ar is halo-substitute-phenyl, and R and R' are lower-alkyl.

19. A compound of the formula

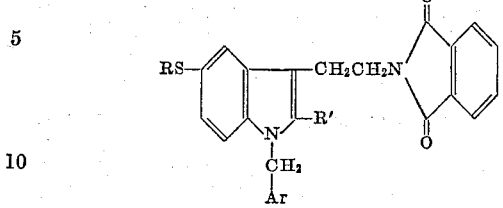

where Ar is halo-substitute-phenyl, R' is phenyl, and R is lower-alkyl.

20. 1 - (2 - chlorobenzyl) - 5-methylmercapto-3-phthalimidoetyhlindole.
21. 1 - benzyl - 2 - methyl-5-methylmercapto-3-phthalimidoethylindole.
22. 1 - (2 - chlorobenzyl) - 2 - methyl-5-methylmercapto-3-phthalimidoethylindole.
23. 1 - (4 - chlorobenzyl) - 2-methyl-5-methylmercapto-3-phthalimidoethylindole.
24. 1 - (2,4 - dichlorobenzyl)-2-methyl-5-methylmercapto-3-pthalimidoethylindole.
25. 1 - (3,4-dichlorobenzyl)-2-methyl-5-methylmercapto-3-phthalimidoethylindole.
26. 1 - (3,4 - methylenedioxybenzyl) - 2 - methyl - 5 - methylmercapto-3-phthalimidoethylindole.
27. 1 - (2 - chlorobenzyl) - 2 - phenyl-5-methylmercapto-3-phthalimidoethylindole.

References Cited in the file of this patent
UNITED STATES PATENTS

| | | |
|---|---|---|
| 2,523,746 | Warner et al. | Sept. 26, 1950 |
| 2,995,566 | Sletzinger et al. | Aug. 8, 1961 |
| 2,995,567 | Sarett et al. | Aug. 8, 1961 |

OTHER REFERENCES

Manske: J. American Chem. Soc., vol. 51, pages 1202–4 (1929).
Conant: The Chem. of Org. Compounds, pages 269, 520–523 (1934).
Murphy: J. Am. Phar. Assoc., vol. 32, page 84 (1943).
Wilkins: New England Journ. of Med., vol. 255#3, pp. 115–118 (1956).
Naturwissenschaften, vol. 46, p. 263 (1959).

UNITED STATES PATENT OFFICE
CERTIFICATE OF CORRECTION

Patent No. 3,074,960                  January 22, 1963

Sydney Archer

It is hereby certified that error appears in the above numbered patent requiring correction and that the said Letters Patent should read as corrected below.

Column 2, lines 57 to 64, the formula should appear as shown below instead of as in the patent:

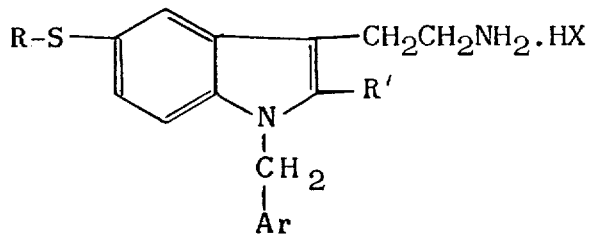

column 4, line 2, for "puroposed" read -- purposes --; column 5, line 19, for "aid" read -- acid --; column 8, lines 7 and 8, for "-(4-methylenemercaptophenyl)hydrazine" read -- -(4-methylmercaptophenyl)hydrazine --; line 53, for "[V; $R'$=n-$C_4H_9$]" read -- [V; $R'$=iso-$C_4H_9$] --; same column 8, line 69, for "inret" read -- inert --; column 9, lines 40 and 41, for "Ar=2-$Cl_2C_6H_3$].-1-(2,4-dichlorobenzyl)-" read -- Ar=2-$ClC_6H_4$]. 1-(2-chlorobenzyl)- --; column 11, lines 1 and 2, for "[IV; R=iso-$C_3H_5$]" read -- [IV; R=iso-$C_3H_7$, Ar=$C_6H_5$] --; line 5, for "Rr=$C_6H_5$" read -- Ar=$C_6H_5$--; line 7, for "Ar=4-$CH_3SC_6H_4$], 1-(4-nitrobenzyl)-" read -- Ar=4-$CH_3C_6H_4$], 1-(4-methoxybenzyl)- --; same column 11, line 17, for "Ar=4-$CHC_3OOC_6H_4$]" read -- Ar=4-$CH_3COOC_6H_4$] --; column 12, line 1, for "[V; $R_2$=" read -- [V; $R'$= --; line 31, for "-methyl-55-", in italics, read -- -methyl-5- --, in italics; line 63, for "acd" read -- acid --; same column 12, lines 72 and 73, for "acid, methylphosphonic acid, phenylphosphinic acid, phenylarsinic acid, phenylstibnic acid," read -- acid, butylarsonic acid, diethylphosphinic acid, p-aminophenylarsinic acid, phenylstibnic acid, --; column 13, lines 17 and 18, for "diehylphosphinate" read -- diethylphosphinate --; lines 18 and 19, for "phenylphosphiniae" read -- phenylphosphinite --; line 48, for "[I; R=$CH_2$, $R'$=$CH_3$, Ar=2-$Cl_6H_4$]" read -- [I; R=$CH_3$, $R'$=$CH_3$, Ar=2-$ClC_6H_4$] --; same column 13, line 64, for "hydotensive" read -- hypotensive --; column 14, line 4, for "Ar=$ClC_6H_4$" read -- Ar=4-$ClC_6H_4$ --; line 14, for "chlorobenzl)-" read -- chlorobenzyl)- --; lines 26 and 27, for "-5-methylmercaptamine", in italics, read -- -5-methylmercaptotryptamine --, in italics; same column 14, line 37, for "$C_{19}H_{20}ClN_2S \cdot HCl$:" read -- $C_{19}H_{20}Cl_2N_2S \cdot HCl$: --; column 16, line 8, for "$R' C_2H_5$" read -- $R'$=$C_2H_5$--;    lines 20 to 22, for 3,074,960

"R=CH$_3$, R=CH$_3$, R'=H, Ar=C$_6$H$_5$], 1-benzyl-2-phenyl-5-methmethyl-mercapto-" read -- R=CH$_3$, R'=C$_6$H$_5$, Ar=C$_6$H$_5$], 1-benzyl-2-(4-chlorophenyl)-5-methylmercapto- --; same column 16, line 54, for "R=iso=C$_4$H$_9$" read -- R=iso-C$_4$H$_9$ --; line 67, for "1-(4-acetaxybenzyl)-" read -- 1-(4-acetoxybenzyl)- --; same column 16, line 70, for "[I; R=CH$_2$, R'=CH$_2$, Ar=4-CH$_2$COOC$_6$H$_4$]" read -- [I; R=CH$_3$, R'=CH$_3$, Ar=4-CH$_3$COOC$_6$H$_4$] --; column 17, lines 70 to 75, the formula should appear as shown below instead of as in the patent:

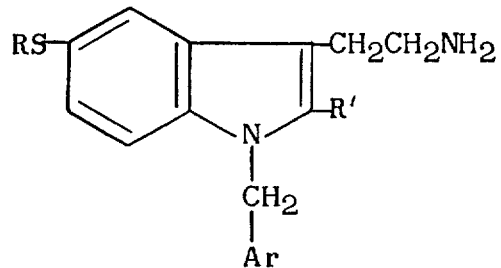

column 18, line 14, column 19, lines 35 and 48, and column 20, line 14, for "halo-substitute-phenyl", each occurrence, read -- halo-phenyl --; column 18, line 48, for "halophenyl" read -- halo-phenyl --; column 20, lines 16 and 17, for "-phthalimido-etyhlindole" read -- -phthalimidoethylindole --.

Signed and sealed this 24th day of December 1963.

(SEAL)
Attest:

ERNEST W. SWIDER
Attesting Officer

EDWIN L. REYNOLDS
Acting Commissioner of Patents